United States Patent [19]

Hee

[11] Patent Number: 4,925,252

[45] Date of Patent: May 15, 1990

[54] AUTOMOBILE BRAKE SYSTEM

[76] Inventor: Nam Y. Hee, 88-284, Dae Jo Dong, Eun Pyung Gu, Seoul, Rep. of Korea

[21] Appl. No.: 292,557

[22] Filed: Dec. 30, 1988

[30] Foreign Application Priority Data

Dec. 30, 1987 [KR] Rep. of Korea ............... 87-15377
Mar. 19, 1988 [KR] Rep. of Korea ............... 88-3697

[51] Int. Cl.⁵ .................... B60T 17/16; B60T 11/28
[52] U.S. Cl. .................................. 303/89; 188/353;
188/30; 192/1.41; 137/598; 137/599.2;
137/630.15; 251/129.02; 251/129.21
[58] Field of Search ............... 303/84.2, 89, 119;
188/265, 353; 192/1.36, 1.4, 1.41; 137/598,
599.2, 630.15; 251/129.02, 129.1, 129.19, 129.21

[56] References Cited

U.S. PATENT DOCUMENTS

| | | | |
|---|---|---|---|
| 2,217,141 | 10/1940 | Sprenkle | 188/353 X |
| 2,502,118 | 3/1950 | Ashton et al. | 188/353 X |
| 2,762,476 | 9/1956 | Gaylord et al. | 137/598 X |
| 3,411,521 | 11/1968 | Johnson | 137/630.15 X |
| 3,447,568 | 6/1969 | Burkart et al. | 137/630.15 X |
| 3,882,959 | 5/1975 | Hsieh | 303/89 X |
| 4,138,165 | 2/1979 | Blomberg et al. | 303/119 X |

FOREIGN PATENT DOCUMENTS 1064  4/1985  Rep. of Korea .
2161875  1/1986  United Kingdom ............ 188/353

*Primary Examiner*—Andres Kashnikow
*Assistant Examiner*—Timothy Newholm
*Attorney, Agent, or Firm*—Salter & Michaelson

[57] ABSTRACT

An automobile brake system includes a master cylinder, a wheel cylinder and a solenoid actuated valve between the master cylinder and the wheel cylinder. The solenoid actuated valve is actuatable for maintaining high fluid pressure in the wheel cylinder after a brake pedal associated with the master cylinder has been released in order to prevent unwanted rearward rolling movement of a vehicle once it has stopped.

1 Claim, 5 Drawing Sheets

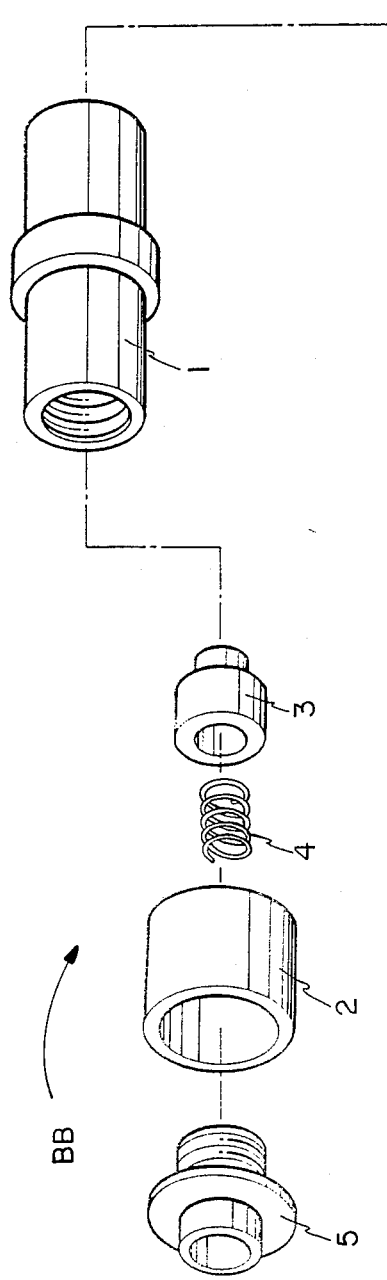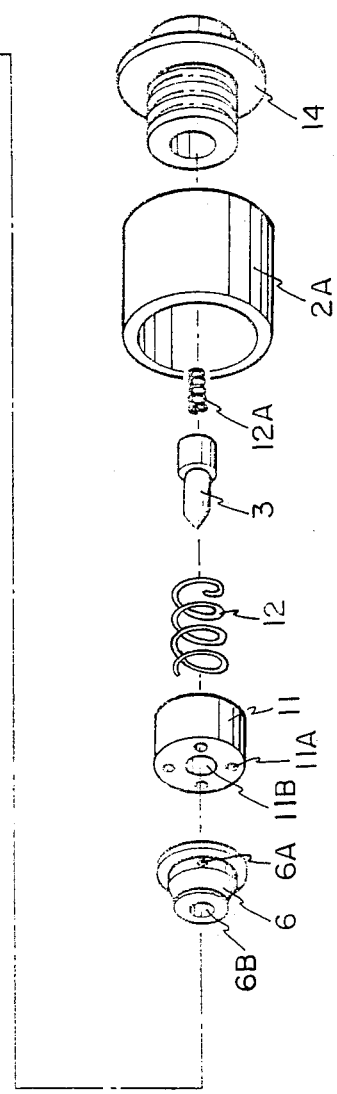
FIG. 4

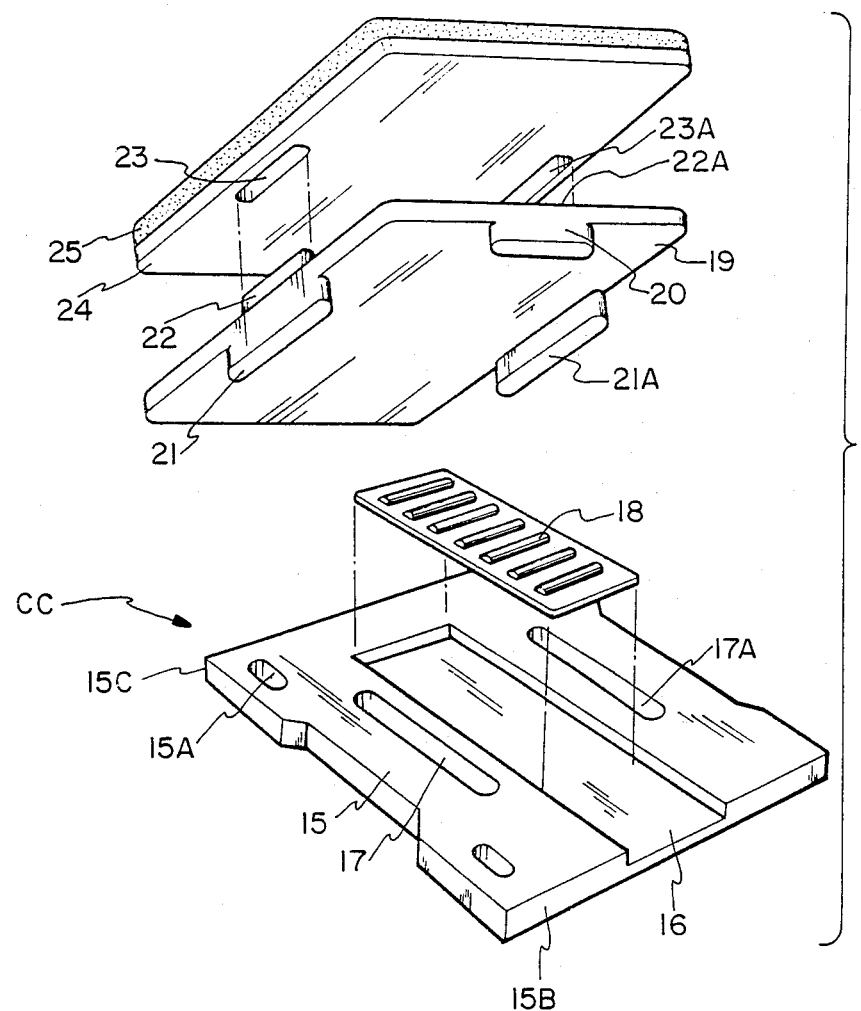

AUTOMOBILE BRAKE SYSTEM

BACKGROUND AND SUMMARY OF THE INVENTION

The instant invention relates generally to automobile brake systems and more particularly to a brake system which operative for preventing unwanted rearward rolling movement of an automobile after it has stopped and a brake pedal associated with the brake system has been released.

Heretofore, it has generally been necessary for automobile operators to maintain the brake pedals of their automobiles in continuously depressed conditions after their automobiles have stopped in order to prevent unwanted rolling movement. In this regard, heretofore accidents have frequently occurred when automobiles have inadvertently rolled backwards due to carelessness or lack of skill on the part of automobile operators. In addition, many of the heretofore available brake systems have been prone to developing loose parking brake cables and hence they have often been less than entirely effective for securing automobiles after they have stopped. Further, because most drivers of automobiles do not normally maintain high levels of braking pressure after their vehicles have stopped, stopped vehicles are often moved significantly when they are impacted by other vehicles during traffic accidents. It has been found that this has substantially increased the tendency of drivers and passengers of vehicles to sustain neck injuries during collisions with other automobiles.

Accordingly, it is an object of the present invention to provide an automobile brake system having an electronic valve between the master cylinder and the wheel cylinder thereof and preferably also having a tapered bearing assembly in the wheel cylinder in order to maintain braking pressure after the automobile has stopped. More specifically, it is an object of the instant invention to provide a brake system which includes an electronic valve between the master cylinder and the wheel cylinder for maintaining braking pressure transmitted to the wheel cylinder after pedal pressure has been released in order to prevent unwanted rolling movement of the vehicle.

Another object of the instant invention is to provide a bearing assembly in the wheel cylinder of an automobile which enables the automobile to start smoothly on a hillside.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 4 is an exploded perspective view of a second embodiment of the electronic valve of the brake system of the instant invention;

FIG. 7 is an exploded perspective view of the bearing assembly of the instant invention.

DESCRIPTION OF THE INVENTION

Figure 1:
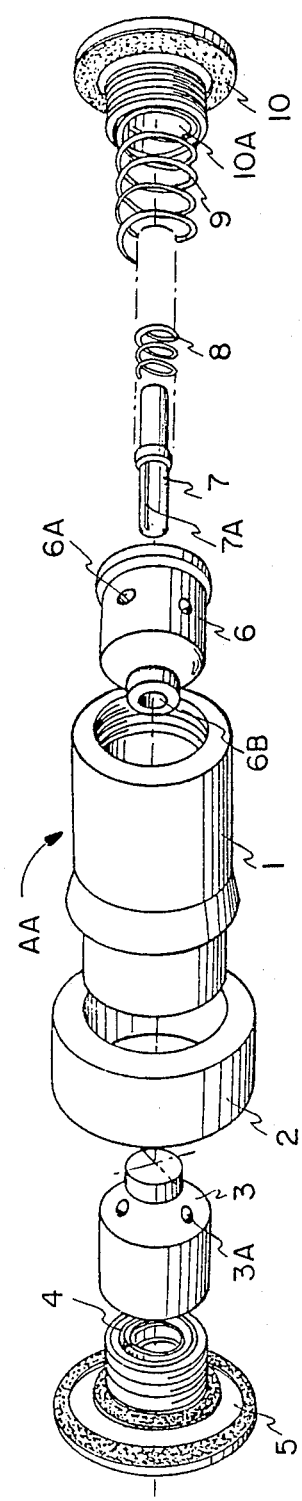
FIG. 1 is an exploded perspective view of a first embodiment of the electronic valve of the brake system of the instant invention.
Figure 2:
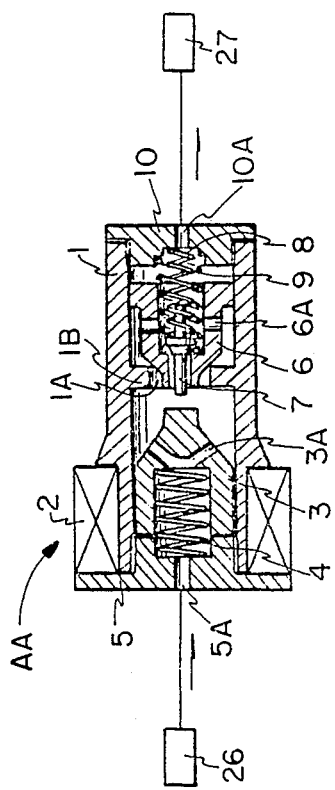
FIG. 2 is a cross sectional view of the valve with the solenoid in an actuated condition.
Figure 3:
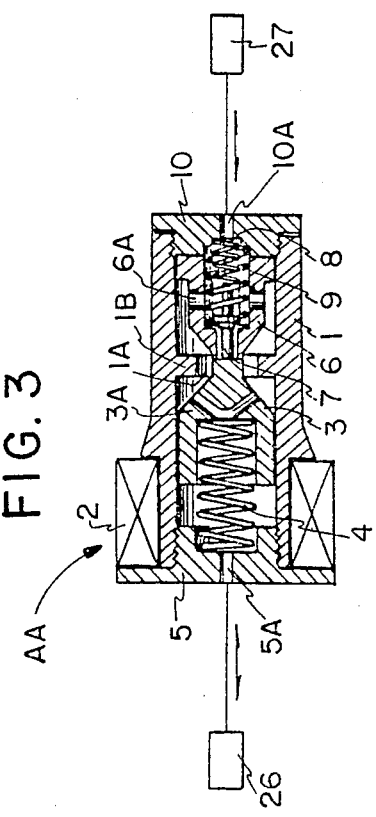
FIG. 3 is a similar cross sectional view with the solenoid in an unactuated condition.

Referring now to the drawings, a first embodiment of the electronic valve of the subject invention is illustrated in FIGS. 1–3 and generally indicated at AA. As illustrated in FIGS. 2–3 the electronic valve AA is installed between a master cylinder 26 and a wheel cylinder 27 and it is operative for controlling the flow of brake fluid therebetween.

The electronic valve AA comprises a braking solenoid 2 which is installed on the outer annular surface of a round tube 1, the braking solenoid 2 being positioned on the end of the valve AA which is connected to the master cylinder 26. An inwardly projecting ring 1B is formed on the inner surface of the round tube 1 and defines a reduced oil passage 1A therein and a front stopper 5 having an oil passage 5A therein is received in the round tube 1 at the end of the valve AA which is connected to the master cylinder 26. A spring 4 is received in the round tube 1 so that it bears against the inner side of the front stopper 5 and a press pad 3 having an oil passage 3A therein is received on the opposite end of the spring 4.

A rear stopper 10 having an oil passage 10A therein is received in the end of the round tube 1 which is connected to the wheel cylinder 27. A switch rod 6 having side oil passages 6A and an axial oil passage 6B therein is received in the round tube 1 so that it is positioned between the ring 1B and the rear stopper 10. A small rod 7 having a coil spring 8 thereon is received in the switch rod 6 so that the small rod 7 projects outwardly slightly through the oil passage 6B. The spring 8 engages the inner end of the rear stopper 10 to bias the small rod 7 to a position wherein it is received in sealing engagement in the oil passage 6B and extends slightly beyond the end of the switch rod 6 as illustrated in FIG. 2. A coil spring 9 is received around the coil spring 8 in the switch rod 6. The spring 9 engages the rear stopper 10 and the switch rod 6 to bias the switch rod 6 to a position wherein it is in sealing engagement with the ring 1B as also illustrated in FIG. 2. In this regard, the springs 4, 8, and 9 are constructed so that the spring 4 is somewhat stiffer than the combined effect of the springs 8 and 9 for reasons which will hereinafter be set forth.

Figure 6:
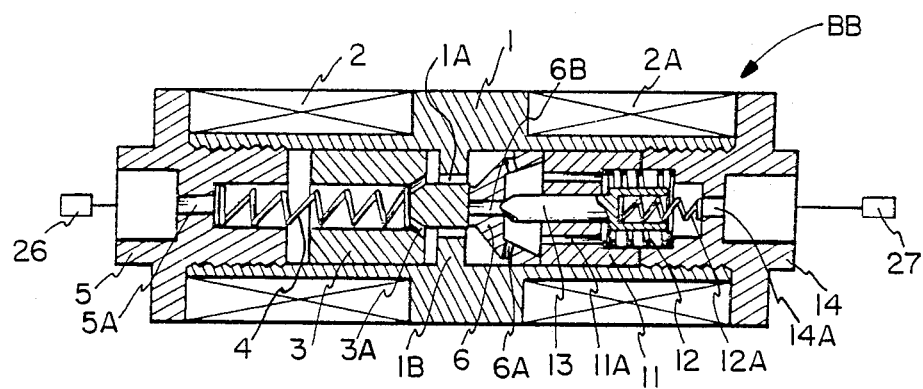
FIG. 6 is a similar cross sectional view with the releasing solenoid in an actuated condition.
Figure 5:
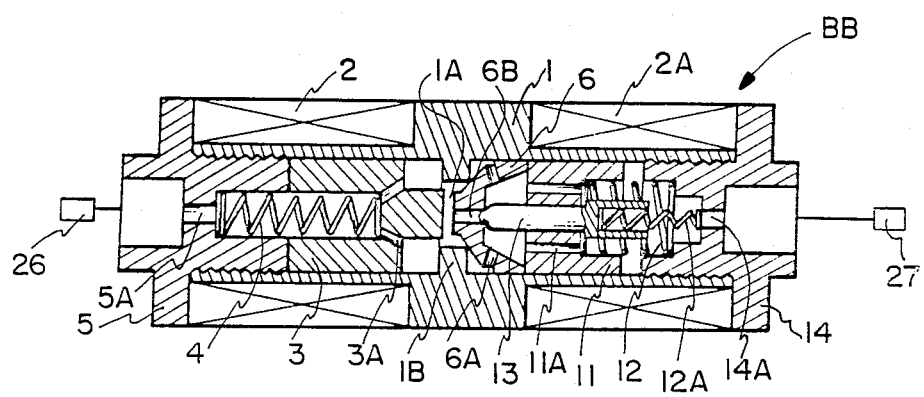
FIG. 5 is a cross sectional view thereof with the braking solenoid in an actuated condition.

A second embodiment of the valve of the subject as illustrated in FIGS. 4–6 and generally indicated at BB. The valve BB is adapted to be connected between a master cylinder 26 and a wheel cylinder 27 and it includes a round tube 1 having an inwardly projecting ring 1B therein and a plug 5 having an oil passage 5A therein, the plug 5 being received in the end of the round tube 1 which is adapted to be connected to the master cylinder 26. The valve BB also includes a press pad 3 and a spring 4 which engages the front stopper 5 to bias the press pad 3 inwardly toward the ring 1B. Also included in the valve BB is a releasing solenoid 2A which is received on the opposite end of the round tube 1 from the braking solenoid 2. A rear stopper 14 having an oil passage 14A therein is received in the end of the round tube 1 which is adapted to be connected to the wheel cylinder 27 and a switch rod 6 having side oil passage 6A and an axial oil passage 6B therein is received in the round tube 1 between the rear stopper 14 and the ring 1B. Received in the interior of the round tube 1 between the switch rod 6 and the rear stopper 14 is a release rod 11 having side oil passages 11A and an axial passage 11B therethrough. A small rod 13 is received in the axial passage 11B and a spring 12A extends between the rear stopper 14 and the small rod 13 to bias the small rod 13 to a position wherein the terminal end thereof is received in sealing engagement in the oil passage 6B of the switch rod 6. An enlarged spring 12 is received around the small rod 13 and extends between the release rod 11 and the rear stopper 14 for biasing the release rod 11 toward a position of sealing engagement with the ring 1B.

Referring to FIG. 7, the bearing assembly of the instant invention which is adapted to be attached to a wheel cylinder is illustrated and generally indicated at CC. The bearing assembly CC includes a body plate 15 having holes 15A, 17, and 17A therein and having an open ended bearing chamber 16 formed therein. The body plate 15 has a first end 15B and a second end 15C and it is constructed so that the thickness of the body plate 15 is tapered or reduced slightly in the longitudinal extent of the body plate 15 from the first end 15B to the second end 15C. A bearing 18 is received in the bearing chamber 16 and a loose plate 19 having a lug 20 thereon is received on the body plate 15 so that it covers the bearing chamber 16 and so that the lug 20 obstructs the open end of the chamber 16 to prevent removal of the bearing 18 therefrom. Lugs 21 and 21a are also formed on the loose plate 19 and are received in the holes 17 and 17A in the body plate 15. A lug 22 is formed on the upper side of the loose plate 19 above the lug 21 and a corresponding lug (not shown) is formed on the upper side of the loose plate 19 above the lug 21A. The lugs on the upper side of the loose plate 19 are received in grooves 23 and 23A on a pad plate 24 and a brake pad 25 is secured to the pad plate 24 as illustrated in FIG. 7.

Figure 8:
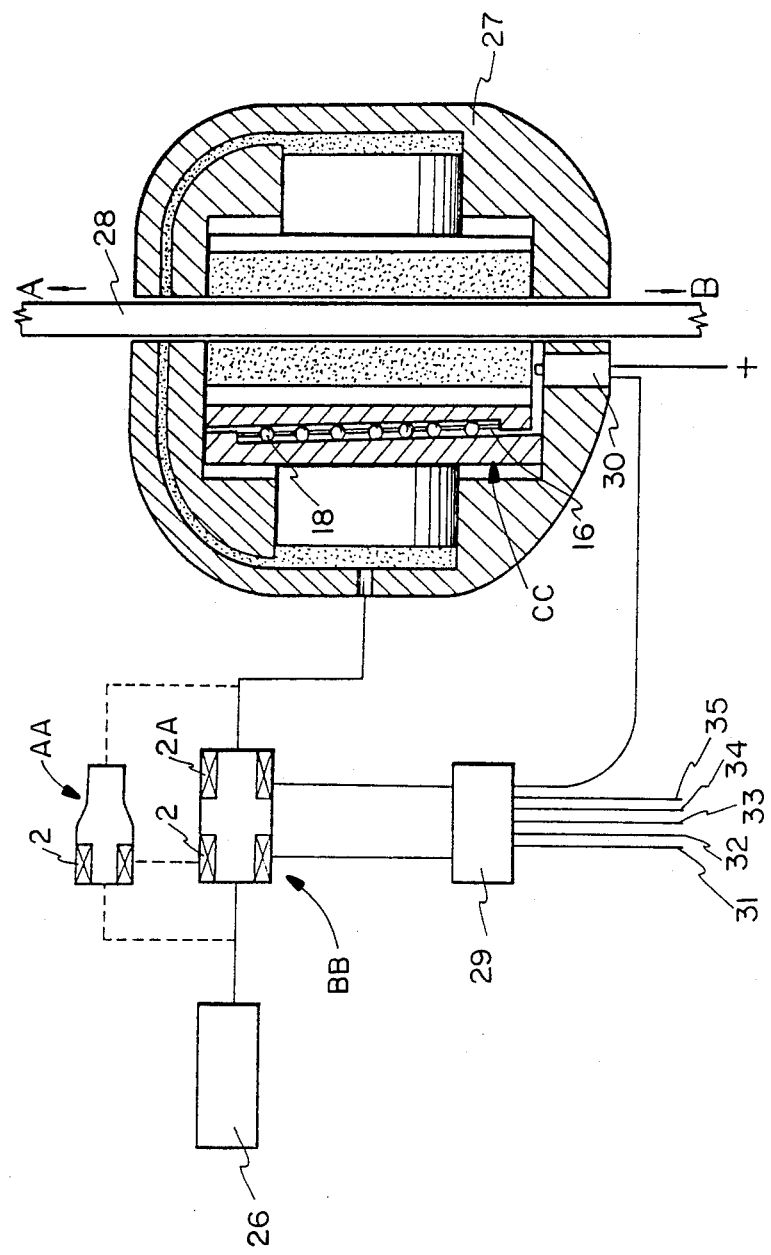
FIG. 8 is a schematic view of the brake system with the bearing assembly mounted in a wheel cylinder.

As illustrated in FIG. 8 the electronic valves AA or BB are attached between a master cylinder 26 and a wheel cylinder 27 and the solenoids 2 or 2 and 2A thereof, respectively, are attached to an electronic control circuit 29. A bearing assembly CC is attached to the wheel cylinder 27 Connected to the control 29 are a brake sensor 30, a wheel rotation sensor 31, a brake pedal sensor 32, an acceleration sensor 33, a forward gear sensor 34 and a backward gear sensor 35. Accordingly, when an automobile in which either the valve BB or the valve CC is installed stops, the rotation sensor 31 indicates that the vehicle's wheels have ceased rotation. The brake pedal sensor 32 indicates that the brake pedal of the vehicle has been depressed and the brake sensor 30 indicates that the brakes have been actuated. In response to these signals the control 29 is operative for actuating the solenoid 2 of one of the valves AA or BB to maintain an elevated hydraulic pressure level in the corresponding wheel cylinder 27. When the automobile again starts movement, the control 29 receives signals from the forward gear sensor 34, the rear gear sensor 35, and/or the acceleration sensor 33 and operates to either release the solenoid 2 or to release the solenoid 2 and actuate the release solenoid 2A so that the corresponding switch AA or BB allows hydraulic fluid to pass between the master cylinder 26 and the wheel cylinder 27.

Referring again more specifically to the switch AA, the spring 4 which engages the press pad 3 has a stronger spring force than the combined effect of the springs 8 and 9 which bias the switch rod 6 and the small rod 7. When the solenoid 2 of the valve AA is in an unactuated condition, such as illustrated in FIG. 3, fluid can pass freely through the oil passage 1A defined by the ring 1B because the spring 4 moves the press pad 3 to a position wherein it engages the small rod 7 and the switch rod 6 to maintain the passage 1A in an open condition. However, when the braking solenoid 2 is energized the press pad 3 is drawn into engagement with the front stopper 5 and it is therefore disengaged from the switch rod 6 and the small rod 7. As a result, the switch rod 6 and the small rod 7 shut off the flow of oil through the passages 1A and 6B due to the spring forces applied to the switch rod 6 and the small rod 7 by the springs 9 and 8, respectively. Nevertheless, oil can still flow from the master cylinder 26 toward the wheel cylinder 27 by deflecting the switch rod 6 and the small rod 7 since the oil is in a high pressure condition due to the braking pressure applied to the associated brake pedal. However, once oil has passed in the direction of the wheel cylinder 27 it cannot return to the master cylinder 26 because the switch rod 6 and the small rod 7 obstruct the openings 1A and 6B. Hence, even if pressure from the master cylinder 26 is released by releasing the brake pedal associated with the master cylinder 26 a braking force is maintained by the wheel cylinder 27.

In order to release the braking pressure applied by the wheel cylinder 27, the solenoid 2 is deactuated so that the press pad 3 is urged against the small rod 7 due to the elasticity of the spring 4. Since the small rod 7 has a relatively small cross sectional area, the spring 4 can easily open the passage 6B so that high pressure oil from the wheel cylinder 27 can flow through the oil passage 7A to the low pressure master cylinder 26. When the oil pressure in the wheel cylinder 27 has been reduced by a sufficient amount in this manner the press pad 3 pushes the switch rod 6 to an open position so that the oil passage 1A is completely opened and so that oil can freely flow through the passages 5A, 3A, 1A, 6A, and 10A to release the braking effect of the wheel cylinder 27.

Referring now to FIGS. 3-6 the operation of the valve BB will be described. As illustrated in FIG. 5 the spring 4 which biases the press pad 3 has a greater spring force than the springs 12 and 12A so that when the solenoid 2 is in an unenergized state the passage 1A is in an open condition and oil can flow through the valve BB between the master cylinder 26 and the wheel cylinder 27. However, as illustrated in FIG. 6, when the solenoid 2 is energized the press pad 3 is drawn into engagement with the front stopper 5 and it is disengaged from the switch rod 6. As a result, the switch rod 6 is thrust into engagement with the ring 1B by the release rod 11 and the small rod 13 with the springs 12 and 12A and the oil passage 1A is shut off as illustrated in FIG. 6. When the valve BB is in this condition oil can pass from the master cylinder 26 to the brake cylinder 27 by depressing the brake pedal so that the oil deflects the push rod 6 and the small rod 13 as it flows through the passage 1A. However, once the oil has passed through the passage 1A toward the wheel cylinder 27 the switch rod 6 and the small rod 13 obstruct the passages 1A and 6B, respectively to prevent the return flow of oil. Accordingly, if the brake pedal is released a high pressure condition is maintained in the wheel cylinder 27, although the pressure in the master cylinder 26 can return to a low pressure state. As a result, the oil pressure in the wheel cylinder 27 is maintained in a high pressure state and the associated brake assembly is maintained in an actuated or braking condition.

When electrical power to the solenoid 2 of the valve BB is discontinued the press pad 3 thereof attempts to push the switch rod 6 to open the oil passage 1A with the elasticity of the spring 4. However, since the oil pressure in the wheel cylinder 27 applies a substantially greater force to the switch rod 6 than the force of the spring 4, the switch rod 6 remains in a closed or actuated condition. In order to release the braking effect produced by the valve BB it is necessary to energized the release solenoid 2A. In this regard, since the pressure applied to the switch rod 6 by the hydraulic fluid from the wheel cylinder 27 is extremely high, the release solenoid 2A would have to be extremely powerful in order to move the switch rod 6 towards the rear stopper 14 to open the passage 1A. The small rod 13, however, can be moved with substantially less force since it has a substantially smaller diameter. Accordingly, by moving the small rod 6A with the solenoid 2A, the small rod 6A can be disengaged from the passage 6B so that high pressure fluid from the wheel cylinder 27 can return to the master cylinder 26. As a result, the braking pressure applied by the master cylinder 26 is released and the press pad 3 can return the switch rod 6 to an open position wherein oil can pass through the oil passage 1A.

Referring now again to FIGS. 7 and 8, the operation of the bearing assembly CC will be more fully described. In this regard, as illustrated in FIG. 8, when an automobile is stopped on an upward incline, the automobile inherently rolls backwards slightly in rearward direction B due to the vehicle's weight. When this occurs the loose plate 19, the pad plate 24, and the pad 25 move rearwardly slightly in the direction B on the bearing 18 and the tapered configuration of the body plate 15 causes the pad 25 to be wedged into further pressurized engagement with the rotor or disc 28 of the vehicle. This also causes the pad 25 to engage the motion sensor 30 so that the control 29 actuates the solenoid 2 to close the valve AA or BB. As a result, the wheel cylinder 27 is maintained in an actuated or braking condition even though pressure on the brake pedal associated with the master cylinder 26 is released. However, when the rotor or disc 28 is rotated in a forward direction by restarting the automobile, the pad 25, the pad plate 24, and the loose plate 19 are moved slightly in the direction A. Accordingly, the pad 25 is disengaged from the sensor 30 and because the body plate 15 is slightly tapered, as the loose plate 19 is moved forwardly, the pressure between the pad 25 and the disc 28 is reduced slightly. Consequently, the disc 28 can rotate between the pads 25 and the control circuit 29 operates to deactuate the solenoid 2 of the valve AA to deactuate the solenoid 2 and actuate the solenoid 2A of the valve BB. This causes the brake cylinder 27 to be returned to a deactuated or non-braking condition.

In the event that the bearing assembly CC on the wheel cylinder 27 is not actuated in the above manner when the vehicle is stopped, the stop sensor signal 31 and the brake pedal switch 32 produce electricals signal which are received by the control circuit 29 in order to actuate the control circuit 29 to produce a similar brake operation. In this event, when the automobile is again operated in the forward direction A electrical signals from the forward gear sensor 34 and the accelerator sensor 33 are set to the control circuit 29 to deactuate the solenoid 2 of the valve AA or to deactuate the solenoid 2 and actuate the release solenoid 2AA of the valve BB.

It is seen therefore that the instant invention provides an effective apparatus for preventing rearward rolling movement of stopped automobiles. The valves AA and BB are operative for maintaining the wheel cylinders 27 associated therewith in actuated conditions even though pressures are released from their respective master cylinders 26. Accordingly, the system of the instant invention is operative for reducing the frequency of accidents resulting from inadvertent rearward rolling movement of automobiles and the like.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An automobile brake hydraulic system comprising an elongated electronic valve, a master cylinder hydraulically connected to one end of said valve, and a wheel cylinder hydraulically connected to the other end of said valve, said valve comprising a round tube having an inwardly projecting ring therein, a braking solenoid on said round tube, an apertured front stopper in said round tube and hydraulically connected to said master cylinder for connecting said valve thereto, a press pad in said round tube, a first spring between said press pad and said front stopper, an apertured rear stopper in said round tube at the opposite end thereof from said front stopper and hydraulically connected to said brake cylinder for connecting said valve thereto, a switch rod in said round tube between said ring and said rear stopper, said switch rod having an axial passage therethrough and being receivable in sealing engagement with said ring, a release rod having an axial passage therethrough received in said round tube between said rear stopper and said switch rod, a small rod received in the axial passage in said release rod and receivable in sealing engagement in the axial passage in said switch rod, a second spring biasing said release rod toward a position wherein it engages said switch rod to position the latter is sealing engagement with said ring, a third spring biasing said small rod toward a position wherein it is received in sealing engagement in the axial passage in said switch rod, said first spring being operable against the combined force of said second and third springs for moving said press pad to a position wherein it engages said switch rod to dislodge it from said position of sealing engagement with said ring to permit the flow of oil through said valve in the direction of said master cylinder, said press pad being engageable with said switch rod to dislodge it from said position of sealing engagement with said ring without engaging said small rod when said small rod is received in sealing engagement in the axial passage in said switch rod, said brake solenoid being actuatable for moving said press pad against the force of said first spring to a position wherein said press pad is disengaged from said switch rod to prevent the flow of oil through said valve in the direction of said master cylinder, and a release solenoid on said round tube actuatable for directly moving said small rod against the force of said third spring to dislodge said small rod from said position of sealing engagement in said axial passage in said switch rod and to thereby permit the flow of oil through said valve in the direction of said master cylinder.

* * * * *